(12) United States Patent
Fairgrieve et al.

(10) Patent No.: US 9,676,390 B2
(45) Date of Patent: Jun. 13, 2017

(54) VEHICLE TRACTION CONTROL (71) Applicant: Jaguar Land Rover Limited, Whitley Coventry, Warwickshire (GB)

(72) Inventors: Andrew Fairgrieve, Rugby (GB); James Kelly, Solihull (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/891,627

(22) PCT Filed: May 16, 2014

(86) PCT No.: PCT/EP2014/060083
§ 371 (c)(1),
(2) Date: Nov. 16, 2015

(87) PCT Pub. No.: WO2014/184344
PCT Pub. Date: Nov. 20, 2014

(65) Prior Publication Data
US 2016/0082972 A1    Mar. 24, 2016

(30) Foreign Application Priority Data

May 16, 2013 (GB) .................................. 1308807.5

(51) Int. Cl.
*G06F 17/00* (2006.01)
*B60W 30/18* (2012.01)
(Continued)

(52) U.S. Cl.
CPC ...... *B60W 30/18172* (2013.01); *B60W 10/06* (2013.01); *B60W 10/184* (2013.01);
(Continued)

(58) Field of Classification Search
CPC ......... B60W 30/18172; B60W 50/082; B60W 50/14; B60W 10/06; B60W 10/184;
(Continued)

(56) References Cited

U.S. PATENT DOCUMENTS

| 27,168 A | * | 2/1860 | Thompsin et al. . F15B 13/0402 |
| | | | 137/625.63 |
| 4,766,972 A | | 8/1988 | Takata et al. |

(Continued)

FOREIGN PATENT DOCUMENTS

| DE | 10013393 A1 | 1/2002 |
| DE | 102005035302 A1 | 2/2007 |

(Continued)

OTHER PUBLICATIONS

International Search Report for application No. PCT/EP2014/060083 dated Aug. 26, 2014, 6 pages.

(Continued)

*Primary Examiner* — McDieunel Marc
(74) *Attorney, Agent, or Firm* — Reising Ethington P.C.

(57) ABSTRACT

A method of setting a vehicle in motion over a driving surface and/or maintaining motion of said vehicle over the driving surface implemented by a control system, said method comprising initiating motion control, initiating motion control comprising: commanding by the control system application of brake torque and drive torque to one or more wheels such that the vehicle is held stationary; subsequently initiating motion from rest while brake torque continues to be applied to the one or more wheels. The strategy may also be implemented to maintain vehicle progress on low friction surfaces. The vehicle driver may be commanded to vary a control input, such as accelerator pedal position, in order to facilitate the maintaining of progress.

20 Claims, 4 Drawing Sheets (51) Int. Cl.
*B60W 50/14* (2012.01)
*B60W 10/06* (2006.01)
*B60W 10/184* (2012.01)
*B60W 50/08* (2012.01)

(52) U.S. Cl.
CPC ...... *B60W 30/18027* (2013.01); *B60W 50/14* (2013.01); *B60W 50/082* (2013.01); *B60W 2530/10* (2013.01); *B60W 2540/04* (2013.01); *B60W 2540/10* (2013.01); *B60W 2550/141* (2013.01); *B60W 2550/148* (2013.01); *B60W 2710/0666* (2013.01); *B60W 2710/182* (2013.01); *B60W 2720/106* (2013.01); *B60W 2720/26* (2013.01)

(58) Field of Classification Search
CPC ..... B60W 30/18027; B60W 2550/141; B60W 2550/148; B60W 2710/0666; B60W 2720/182; B60W 2720/26; B60W 2530/10; B60W 2540/04; B60W 2540/10; B60W 2720/106
USPC .......................................................... 701/84
See application file for complete search history.

(56) References Cited

U.S. PATENT DOCUMENTS

| | | | |
|---|---|---|---|
| 4,936,404 A | 6/1990 | Matsumoto | |
| 4,989,686 A * | 2/1991 | Miller | B60K 23/0808 180/197 |
| 5,193,061 A | 3/1993 | Tsuyama et al. | |
| 6,542,806 B1 * | 4/2003 | Suhre | B60K 28/16 701/82 |
| 6,862,513 B2 | 3/2005 | Trefzer et al. | |
| 8,244,445 B2 | 8/2012 | Luehrsen et al. | |
| 2003/0216850 A1 | 11/2003 | Trefzer et al. | |
| 2005/0049774 A1 | 3/2005 | Kogure | |
| 2005/0103549 A1 | 5/2005 | Matsuda | |
| 2006/0152077 A1 | 7/2006 | Ogawa | |
| 2010/0228458 A1 | 9/2010 | Bach et al. | |
| 2012/0073929 A1 * | 3/2012 | Grutter | B60K 17/344 192/53.1 |
| 2015/0073674 A1 * | 3/2015 | Kelly | B60K 28/16 701/69 |
| 2016/0185216 A1 * | 6/2016 | Clarke | B60K 23/08 74/665 F |

FOREIGN PATENT DOCUMENTS

| | | |
|---|---|---|
| DE | 102005035303 A1 | 2/2007 |
| DE | 102006043618 A1 | 3/2008 |
| DE | 10201028087 A1 | 10/2011 |
| EP | 0321893 A2 | 6/1989 |
| EP | 0574150 A1 | 12/1993 |
| GB | 2390652 A | 1/2004 |
| GB | 2446419 A | 8/2008 |
| GB | 2454337 A | 5/2009 |
| JP | H071988 A | 1/1995 |
| JP | H0872689 A | 3/1996 |
| JP | 2003327111 A | 11/2003 |
| WO | 0114186 A1 | 3/2001 |
| WO | 2013144346 A1 | 10/2013 |

OTHER PUBLICATIONS

Combined Search and Examination Report for corresponding application No. GB 1408698.7, dated Nov. 21, 2014, 2 pages.
Combined Search and Examination Report for corresponding application No. GB 1308807.5, dated Nov. 15, 2013, 5 pages.
Japanese Office Action in Japanese with English summary for JP application No. 2016-513383, dated Sep. 27, 2016, 4 pages.

* cited by examiner

VEHICLE TRACTION CONTROL

TECHNICAL FIELD

The present invention relates to vehicle traction control and particularly, but not exclusively, to a system and method of improving traction control of a vehicle, for example moving a vehicle from rest, and maintaining vehicle progress in off-highway conditions. Aspects of the invention relate to a method, to a system and to a vehicle.

BACKGROUND

Moving a vehicle from rest in highway conditions on a dry asphalt surface is well understood. Where a coefficient of friction (μ or 'mu') between vehicle tyres and ground is reduced or inconsistent, a conventional approach to vehicle launch may result in excessive slip of one or more wheels. This is particularly problematic for novice drivers in off-highway conditions. For example on sand, injudicious spinning of the wheels may cause the vehicle to excavate the sand and fail to gain sufficient traction to make progress over the sand. The novice off-highway driver may not appreciate, from inside the vehicle, that one or more wheels are spinning, and the fitment of deep tread off-highway tyres may exacerbate this problem due to their tooth-like excavating properties. Furthermore, in some situations excessive wheel spin can result in damage to the surface on which the vehicle is driving, particularly in the case of relatively fragile surfaces such as grass.

When a vehicle is in motion in slippery conditions, it may be relatively easy to induce excessive wheel spin and thereby lose traction, especially where variations in mu are experienced as the vehicle progresses.

It is against this background that the present invention has been conceived. Embodiments of the invention provide a method and system of moving a vehicle from rest and/or maintaining motion of said vehicle over the driving surface. Other aims and advantages of the invention will become apparent from the following description, claims and drawings.

SUMMARY OF THE INVENTION

Aspects of the invention provide a method, a system and a vehicle as claimed in the appended claims.

In one aspect of the invention for which protection is sought there is provided a method of setting a vehicle in motion over a driving surface and/or maintaining motion of said vehicle over the driving surface implemented by a control system, said method comprising initiating motion control, initiating motion control comprising:
  commanding by the control system application of brake torque and drive torque to one or more wheels such that the vehicle is held stationary,
  subsequently initiating motion from rest whilst brake torque continues to be applied to the one or more wheels.

In an aspect of the invention for which protection is sought there is provided a method of setting a vehicle in motion over a driving surface and maintaining motion of said vehicle over the driving surface, the method comprising:
  commanding application of brake torque and drive torque to one or more wheels such that the vehicle is held stationary;
  subsequently initiating motion from rest whilst brake torque continues to be applied to the one or more wheels,
  wherein the method further comprises automatically maintaining slip of one or more vehicle wheels over the driving surface, wherein the value of slip maintained is within a predetermined range.

In an embodiment the value of slip maintained may be determined in dependence on one or more characteristics of the driving surface. Optionally, the value of slip maintained may further depend on the speed of the vehicle.

In some embodiments the value of slip maintained may decrease with increasing vehicle speed.

In some embodiments the value of slip maintained may be automatically reduced as the vehicle speed approaches a speed that corresponds to the motor speed.

In some embodiments the slip may be maintained in the range 5-20%.

It is to be understood that brake torque is therefore applied to the one or more wheels to oppose the drive torque whilst the one or more wheels are driven substantially from a rest condition in which the vehicle is substantially stationary.

Embodiments of the present invention have the advantage that a risk of flare of the one or more wheels, in which excessive wheel spin occurs, may be reduced. As noted above, when a vehicle is seeking to initiate motion from rest on a surface having a relatively low coefficient of friction, the amount of wheel slip may easily become excessive when drive torque is applied to one or more wheels. Embodiments of the present invention overcome this problem by applying a braking torque to one or more driven wheels to oppose rotation thereof. The braking torque is applied whilst the vehicle is accelerated from rest. A braking system may be applied before drive torque is applied to the wheels, such that as drive torque is applied, brake torque developed by the braking system increases in a manner to oppose motion of the vehicle. The braking system may be arranged to maintain the vehicle substantially stationary until sufficient drive torque is being applied to the one or more wheels. The amount of brake torque may then be reduced in order to initiate turning of the one or more wheels. Alternatively or in addition the amount of drive torque may be increased, at least until turning of the one or more wheels is commenced.

Reference herein to application of brake torque may be understood to refer to the application of a retarding torque which opposes the applied drive torque, the drive torque being torque applied in a direction so as to promote vehicle progress in the required direction of travel. The retarding torque may be applied by means of an electric machine, optionally an electric machine operable as at least part of a regenerative braking system, by means of a friction-based foundation braking system or by any other suitable means. The electric machine may in some embodiments be operable as a traction (or propulsion) motor.

It is to be understood that embodiments of the present invention may employ brake torque to modulate the amount of drive torque applied to a wheel to enable precise control of wheel speed as the vehicle is accelerated from rest. Modulation of drive torque generated by an engine such as an internal combustion engine may not be possible on the relatively short timescales required to prevent excessive slip due at least in part to inertia of moving components of the engine. The use of a braking system such as a friction braking system or a regenerative braking system in combination with torque developed by an engine facilitates application of drive torque in a more controlled manner, enabling improved control of wheel slip. In particular, net torque applied to a wheel (being the resultant of powertrain drive torque and braking system brake torque) may be finely modulated from substantially zero net torque if the braking system and powertrain are controlled in a synchronised manner.

The method may comprise automatically maintaining slip of one or more vehicle wheels over ground in the range 5-20%. The amount of slip maintained may be controlled by the control system to assume a value that is dependent on vehicle speed. For example the value may decrease with increasing vehicle speed. In addition or instead the value of slip maintained may be determined in dependence on one or more characteristics of a driving surface such as roughness, amount of drag imposed on a vehicle driving over the surface, and/or one or more other characteristics.

Thus it is to be understood that some embodiments of the invention permit controlled relative slipping of one or more vehicle wheels on the terrain so as to ensure effective traction without resulting in loss of control or vehicle instability. Slipping of the wheels on the terrain may be accomplished by automatically controlling the vehicle powertrain and a braking system in a suitable manner. For example, the engine and optionally one or more clutches or torque converters may be controlled to generate positive drive torque. Slipping of one or more wheels may be accomplished by controlling the amount of powertrain drive torque and the amount of brake torque applied to a wheel such that sufficient torque is developed to ensure that slipping occurs whilst preventing the development of excessive slip. As noted above, the brake torque may be provided at least in part by a component of the powertrain such as an electric machine.

In some embodiments, the control system is operable to apply positive drive torque and brake torque (negative torque) to one wheel or a pair of wheels such as wheels of a front or rear axle, and not to apply torque to one or more (undriven) wheels. The system monitors rotation of the undriven wheels in order to determine vehicle speed and therefore whether excessive slip of the driven wheels is occurring.

In some embodiments, the relative amounts of torque applied to left and right driven wheels of an axle may be varied in order to aid launch from rest. Similarly, in the case that forward and rear wheels are driven, for example in a four wheel drive vehicle, the relative amounts of torque applied to the front and rear wheels may be varied independently so as to aid vehicle launch from rest.

The motor may be an internal combustion engine, an electric motor or another source of motive power. A vehicle may have one or more motors and/or engines. In some embodiments such as in hybrid electric vehicles the vehicle may include an engine and one or more electric motors.

In an embodiment of the invention said motion control is automatically ceased when vehicle speed is substantially compatible with (corresponds substantially to) motor speed, indicating that sufficient traction of the vehicle is available to maintain progress.

In one embodiment of the invention said motion control may be automatically engaged and disengaged in dependence upon whether the vehicle is making progress in accordance with the intention of the vehicle driver.

Thus in one embodiment a vehicle system may automatically compare a driver request, for example an accelerator pedal input such as depression of the accelerator pedal, with response of the vehicle, for example acceleration thereof. If the vehicle response is indicative of excessive wheel slip a method according to an embodiment of the invention may be automatically invoked. For example, if the driver depresses the accelerator pedal but vehicle acceleration is not as high as expected the system may determine that excessive wheel slip is occurring and invoke a method according to an embodiment of the present invention. The method may be referred to as 'traction aid' or motion control. Where traction aid is invoked to assist launch from rest, a method according to an embodiment of the invention may be referred to as launch assist.

In the case of an automatic system the method may utilize a target speed and adopt or revert to a standby mode when the vehicle reaches the target speed. That is, traction aid may cease in such circumstances. In the event of departure of the vehicle from the target speed by a predetermined amount, for example it the vehicle speed falls below the target speed by the predetermined amount, traction aid may be automatically re-implemented if an increase in speed is again requested. An increase in speed may be requested for example if a driver depresses an accelerator pedal by a sufficient amount or if an automatic speed control system is active and commands an increase in vehicle speed.

The method may in addition or instead include an exit strategy whereby automatic motion control will time-out after a predetermined period, which period may be dependent on the condition of vehicle use. A time-out may be indicated in circumstances where a method according to an embodiment of the invention is used to assist launch. Alternatively the system may cancel (e.g. deselect) motion control if the vehicle driver demands drive torque that exceeds that which the system determines is required to implement launch assist or traction aid, or if the driver actuates the braking system, for example by depression of a brake pedal or the like.

Known wheel speed comparison techniques may be used to determine slipping of driven wheels with respect to non-slipping wheels. Alternatively the rotational speed of driven wheels may be compared with a vehicle position sensing device in order to relate wheel and vehicle movement. Slipping in excess of the permitted value may be controlled in some embodiments of the invention by application of the relevant wheel brake, by a reduction in motor torque and/or by a redistribution of motor torque via a device such as a controllable limited slip differential (torque vectoring).

Camera recognition techniques may be used to determine vehicle movement, for example by looking at one or more vehicle wheels to detect slipping thereof, or to look at the terrain surface to determine whether the vehicle is moving at a speed compatible with transmission output speed, engine speed and/or wheel speed.

The permitted slip of wheels (and their associated tyres) may be selected according to the type of terrain. The type of terrain may be selected by the vehicle driver, or automatically sensed by a suitable sensor system of the vehicle. Thus on a relatively hard surface, the permitted slip of any driven wheel may be close to 5% whereas on a soft surface a greater amount of slip may be permitted in order to gain traction. The amount of permitted slip may be dependent on wheel speed.

In one embodiment the method includes automatically reducing the permitted slip as the vehicle and motor speeds approach compatibility, so as to blend gradually from a condition of relatively high slip to one of low or substantially no slip. Thus on a hard surface permitted slip may blend towards a relatively low value as motor and vehicle speeds become commensurate. On a soft surface, such as sand, it may be desirable to maintain a degree of slip at all times so that relatively high slip may be blended to a lower slip value as the vehicle speed and wheel speed approach compatibility. Comparison of vehicle speed may alternatively be made with a rotating transmission element or another portion of the powertrain instead of the motor.

In one embodiment of the invention, forward vehicle acceleration may be limited to a predetermined value during movement control, for example 1.25 m/sec$^2$ or less, so as to ensure smooth and progressive movement of the vehicle. The maximum permitted forward acceleration may be dependent upon the terrain type which is selected. In the event that vehicle acceleration approaches the predetermined value, the degree of permitted wheel slip is reduced. Should vehicle acceleration not reach the permitted value, the degree of permitted wheel slip may be increased up to the maximum allowable for the terrain on which the vehicle is driven.

In some embodiments a method according to an embodiment of the invention can be used to ensure effective movement of the vehicle from rest, and may be substantially ceased within 1.5 vehicle lengths. Likewise the method may allow progress to be maintained over a soft surface, such as sand.

The method may comprise automatically terminating motion control once a speed of the vehicle over the driving surface exceeds a prescribed value.

Thus in some embodiments motion control is terminated once the vehicle has reached a prescribed speed.

Alternatively or in addition the method may comprise automatically terminating motion control once a prescribed period of time has elapsed.

The method may comprise automatically terminating motion control once a value of surface coefficient of friction between the vehicle and driving surface exceeds a prescribed value.

Thus in some embodiments the value of surface coefficient of friction of the driving surface is monitored substantially continuously or intermittently. It the value of coefficient of friction exceeds a prescribed value motion control is terminated automatically. This has the advantage that an amount of time or distance over which motion control is performed may be reduced in some circumstances. Thus if a vehicle moves from a slippery grass surface of relatively low surface coefficient of friction to an asphalt surface of relatively high surface coefficient of friction in a relatively short distance, motion control may be terminated as soon as the control means is able to recognise the change in driving surface. In some embodiments motion control may be terminated in a gradual manner in order to enhance vehicle composure.

In some embodiments motion control of the vehicle may be phased out with respect to one wheel before being phased out with respect to another wheel. For example if a first set of one or more wheels depart a surface of relatively low coefficient of friction before a second set of one or more wheels, motion control may be phased out in respect of the first set before the second set. Thus, termination of motion control of respective wheels such as individual driven wheels or groups of driven wheels such as pairs of driven wheels may be implemented independently of one another.

The method may comprise initiating motion control in dependence on a state of a user operable motion control input means, for example a vehicle launch assist selector control.

Thus in some embodiments a control button may be provided allowing a user automatically to initiate motion control. The control button may for example comprise a movable switch device or a touch sensitive device such as a touch sensitive button or a touchscreen arrangement. Other input means are also useful such as voice controlled input means or any other suitable input means. In some embodiments, motion control may be initiated by an accelerator pedal input after selecting motion control, for example via a menu-driven user interface.

Alternatively or in addition the method may comprise initiating automatically motion control in dependence on one or more characteristics of the driving surface.

The method may comprise initiating automatically motion control in dependence on a value of surface coefficient of friction between one or more wheels and the driving surface.

The method may comprise initiating automatically motion control in dependence on a value of one or more vehicle or environmental parameters such as an ambient temperature or a temperature of one or more components of the vehicle.

Thus in some embodiments motion control may be initiated automatically if the control means determines that the value of surface coefficient of friction so warrants. For example motion control may be initiated if the control means determines that the value of surface coefficient of friction is below a prescribed value.

The method may comprise the step of estimating a current value of surface coefficient of friction according to at least one selected from amongst a determination whether precipitation has occurred since the vehicle last moved; and one or more measured values of ambient temperature made since the vehicle last moved. Thus, prior to initial launch of a vehicle from rest, the method may comprise estimating the current value of surface coefficient of friction and determining automatically whether motion control should be performed.

It is to be understood that a value of surface coefficient of friction between vehicle and driving surface may fall in the event that precipitation occurs. Thus if rain or snow falls on a surface such as dry grass or asphalt, the value of surface coefficient of friction may fall to a value at which excessive wheel slip will occur upon launch of the vehicle. In some cases excessive wheel slip may occur due to loading of the vehicle, or due to a load the vehicle is towing.

Accordingly, the method may comprise detecting precipitation and revising an estimate of the value of surface coefficient of friction in dependence on detection of precipitation. The method may comprise taking into account ambient temperature in estimating the surface coefficient of friction. If the temperature is below a prescribed value, such as substantially zero Celsius, and precipitation has been detected, motion control may be initiated automatically, optionally in further dependence on one or more further parameters. The prescribed value of surface coefficient of friction may be determined in dependence on an estimate of train load. The estimate of train load may take into account whether or not a trailer is connected to the vehicle, a slope of a driving surface and whether the vehicle is ascending or descending the slope. Other parameters/factors may also be taken into account.

In some embodiments the method may comprise determining the amount or relative amount of weight that is being borne by each respective driven wheel, and setting the prescribed value of surface coefficient of friction in dependence on the amount of weight borne by one or more wheels. The method may comprise determining the relative amount of weight on a given wheel by reference to data in respect of vehicle attitude, wheel articulation and/or any other data in addition or instead. Thus, if the vehicle determines that one or more wheels is at full 'droop', i.e. at a lower limit of travel in a downward direction, the method may comprise increasing the prescribed value of surface coefficient of friction below which motion control is initiated.

In some arrangements, if the amount of weight on a given wheel falls below a prescribed value, or the relative amount of weight falls below a prescribed value, motion control may be initiated automatically regardless of the value of surface coefficient of friction.

In some arrangements motion control may be initiated in dependence on vehicle loading or a change in vehicle loading. For example if a vehicle has reduced in weight whilst stationary, for example due to unloading of cargo, motion control may be initiated if it is determined that the vehicle will or may launch on a surface of relatively low coefficient of friction. This feature may be particularly useful for example for delivery trucks since they may experience substantial variations in loading. In one example scenario, a truck may unload a cargo in an underground loading bay and subsequently require to drive uphill out of the loading bay over a slippery surface. A control system according to an embodiment of the present invention may be usefully deployed in such a vehicle to assist negotiation of the slippery surface as the vehicle initiates motion.

Optionally, the system may store data in respect of one or more ambient environmental conditions such as ambient temperature and whether precipitation is present. The system may also store a current value of surface coefficient of friction and optionally one or more other parameters associated with the vehicle. When motion is subsequently initiated from rest the control system may automatically activate motion control, i.e. application of brake torque to one or more wheels whilst the vehicle is accelerated from rest, in dependence on the stored data. As described above, application of brake torque may be by application of a wheel brake, or application of negative torque to a driveline of the vehicle for example by means of an electric machine.

In an embodiment, if the stored data indicates that the surface coefficient of friction at one or more driven wheels when the vehicle last stopped was such as to require motion control to initiate motion from rest when the vehicle last stopped, the control system may automatically apply motion control when the driver subsequently commands motion from rest.

In some embodiments, if the control system determines that precipitation was present when the vehicle last stopped and that the surface may now have a coefficient of friction below a prescribed value, the system may automatically apply motion control when the driver commands motion from rest. The system may estimate the current value of surface coefficient of friction in dependence at least in part on data in respect of current ambient temperature. Other arrangements are also useful.

In some embodiments, when the control system applies motion control with braking applied to driven wheels only the system may prevent illumination of an external brake indicator lighting system, such as brake lights or the like, unless a driver depresses a brake pedal or other brake actuator. In some embodiments a hazard warning lighting system may be activated, such as flashing direction indicator lamps or the like.

The method may include the step of selection by the driver of an operating condition of the vehicle by the control system.

The method may include the step of automatic selection of an operating condition of the vehicle.

The operating condition may correspond to a prescribed configuration of one or more vehicle subsystems.

The method may include automatically initiating said motion control upon selection of a prescribed vehicle operating condition.

The method may include determining a maximum permitted slip according to an operating condition of the vehicle, the method comprising limiting slip to the maximum permitted value.

The method may advantageously comprise maintaining driving wheels of the same axle at a speed differential of less than a prescribed value, optionally less than 10%.

The method may include the step of maintaining all driving wheels of the vehicle at a speed differential of less than a prescribed value, optionally less than 10%.

Optionally the method may include the step of limiting forward acceleration of the vehicle to a prescribed value, optionally to a value that is less than 1.5 m/sec.

The method may include the step of automatically reducing the percentage slip of wheels with respect to ground as vehicle and engine speeds become compatible.

Advantageously said percentage slip may be reduced progressively.

Optionally said motion control is ceased when actual vehicle speed is greater than a prescribed proportion of the theoretical vehicle speed at the instant motor speed. The prescribed proportion may be 90% or any other suitable value.

The method may include determining a maximum permitted slip according to an operating condition of the vehicle.

The method may include selection by the driver of an operating condition of the vehicle.

The method may include automatic selection of an operating condition of the vehicle.

The method may include comparing transmission speed with the speed of a non-driven wheel in order to determine slip. As noted above, in some embodiments a speed of a driven wheel may be compared with that of a non-driven wheel in order to determine slip.

Alternatively or in addition the method may include comparing transmission speed and ground speed in order to determine slip.

Alternatively or in addition the method may include using a value of torque reaction of driven wheels in order to determine slip. That is, the method may include the step of comparing a measured amount of torque at a wheel with an expected amount, for example an expected amount for a given amount of power or torque developed by a powertrain of the vehicle, in order to estimate a value of slip of the wheel.

Initiating motion control may comprise managing net torque applied to one or more wheels whilst brake torque continues to be applied in order to accelerate the vehicle.

The method may comprise selecting an amount of brake torque applied to wheels of a given axle in dependence on a distribution of vehicle weight between forward and rearward portions of a vehicle.

Thus, the amount of brake torque applied to wheels of a given axle (such as a pair of front wheels or a pair of rear wheels) may be selected in dependence on the relative amounts of weight on front and rear axles of the vehicle. If the amount of weight on a rear axle is greater than that on a front axle, a greater amount of brake torque may be applied to wheels of the front axle compared with wheels of the rear axle.

Similarly, an amount of brake torque applied may depend on whether a wheel is a driven wheel or not. In the case of a non-driven wheel, brake torque may not be applied when motion is initiated from rest, so that a measure of vehicle speed may be obtained by reference to a speed of rotation of the non-driven wheel.

In the case of a front wheel drive vehicle, when motion is initiated from rest brake torque may be applied to front wheels of the vehicle as the vehicle is driven from rest. However, brake torque may be released from the rear wheels in order not to impede acceleration of the vehicle, and enable a more accurate measurement of vehicle speed to be made compared with measurement of speed of rotation of the rear wheels which may be slipping. Similarly, for a rear wheel drive vehicle brake torque may be applied to the rear wheels but not the front wheels as motion is initiated from rest.

The method may include providing an indication to a user of a required state or condition of one or more driver-applied control inputs such as an amount by which an accelerator pedal should be depressed, a gear that should be selected by means of a transmission or hi/low ratio selector, a state of a terrain response mode controller that should be selected or any other suitable driver-applied control input. The indication may be provided to the driver by means of a human machine interface (HMI) system. Alternatively or in addition the method may include the step of providing the indication by voice message, haptic indication and/or warning tone. Thus the user may be provided with instructions to enable the method to be implemented.

In a further aspect of the invention for which protection is sought there is provided a method of maintaining motion of a vehicle on a low friction driving surface, the method comprising detecting loss of traction of the vehicle, implementing a strategy of applying brake torque and drive torque to one or more vehicle wheels, and during implementation of said strategy advising the vehicle driver of required driver-applied control inputs to the vehicle. The driver-applied control inputs may be for example in respect of an amount by which an accelerator pedal should be depressed, a gear that should be selected by means of a transmission or hi low ratio selector, a state of a terrain response mode controller that should be selected or any other suitable driver-applied control input.

In an aspect of the invention for which protection is sought there is provided a method of maintaining motion of a vehicle on a low friction driving surface, the method comprising detecting loss of traction of the vehicle, implementing a strategy of applying brake torque and drive torque to one or more vehicle wheels, determining required control inputs to maintaining slip of one or more wheels on the driving surface in a predetermined range, and during implementation of said strategy advising the vehicle driver of required control inputs to the vehicle to maintain said slip.

The method may include the step of maintaining slip of one or more wheels on the driving surface in the range 5-20%.

Optionally, a determination that loss of traction has occurred may require that an amount of slip at any tyre/ground interface exceeds 2%.

The method may include the step of advising the vehicle driver by dashboard message, voice message, haptic indication and/or warning tone.

Advantageously, a required driver-applied control input to the vehicle may comprise variation of accelerator pedal position.

Optionally the strategy is ceased automatically if wheel slip falls below a predetermined minimum.

The strategy may be adapted to be disabled by the vehicle driver.

Optionally, the strategy is automatically enabled upon selection or detection of an off-road condition.

Advantageously the strategy may be disabled above a predetermined vehicle speed.

In an aspect of the invention for which protection is sought there is provided a method of setting a vehicle in motion over a driving surface and/or maintaining motion of said vehicle over the driving surface implemented by a control system, said method comprising initiating motion control, initiating motion control comprising: commanding by the control system application of a brake to one or more driven wheels; commanding application of drive torque to the one or more driven wheels such that the vehicle is held stationary; subsequently initiating motion from rest whilst a brake continues to be applied to the one or more driven wheels to oppose the drive torque applied.

In one aspect of the invention for which protection is sought there is provided a control system for setting a vehicle in motion over a driving surface and/or maintaining motion of said vehicle over the driving surface, the system being operable to initiate motion control by commanding application of brake torque and drive torque to one or more wheels such that the vehicle is held stationary; the system being operable subsequently to initiate motion from rest whilst brake torque continues to be applied to the one or more wheels.

In a further aspect of the invention for which protection is sought there is provided a control system for setting a vehicle in motion over a driving surface and/or maintaining motion of said vehicle over the driving surface, the system being operable to initiate motion control by commanding application of brake torque and drive torque to one or more wheels such that the vehicle is held stationary and subsequently to initiate motion from rest whilst brake torque continues to be applied to the one or more wheels, the system being further configured to automatically maintain a value of slip of one or more vehicle wheels over the driving surface, wherein the value of slip maintained is within a predetermined range.

In an embodiment the control system may further comprise:
an electronic processor; and
an electronic memory device electrically coupled to the electronic processor and having instructions stored therein,
wherein the processor is configured to access the memory device and execute the instructions stored therein such that the system is operable to:
initiate said motion control and automatically maintain said value of slip within said predetermined range.

In some embodiments said processor may comprise an input for receiving an electrical signal indicative of one or more characteristics of the driving surface over which the vehicle is travelling, wherein
said processor is configured to determine said value of slip in dependence on said signal indicative of said one or more characteristics of the driving surface.

In some embodiments said processor may further comprise an input for receiving an electrical signal indicative of the speed of the vehicle, wherein
said processor is configured to determine said value of slip to be maintained in dependence upon said value of slip in dependence on said signal indicative of the speed of the vehicle.

In some embodiments said value of slip maintained may decrease with increasing vehicle speed.

In some embodiments said processor may further comprise an input for receiving an electrical signal indicative of the engine speed of the vehicle, wherein said processor is configured to compare automatically said signal indicative of the engine speed of the vehicle and said signal indicative of the speed of the vehicle and reduce said maintained value of slip as said vehicle speed approaches a speed that corresponds to the engine speed.

The system may be operable to command application of a brake substantially continuously to the one or more wheels, and subsequently to command application of drive torque to one or more wheels. As the drive torque is applied, brake torque is expected to increase to oppose the drive torque and reduce a risk of flare, whilst allowing the wheel to begin to rotate once the drive torque is sufficiently large to overcome the brake torque applied by the braking system.

The system may be operable to command a user of the vehicle to apply drive torque to the wheels, optionally drive torque of a prescribed amount, further optionally drive torque up to a prescribed amount. The command may be provided by means of a HMI display, a voice command or any other suitable means. Alternatively the control system may be operable to command a powertrain controller to apply drive torque to the wheels.

The control system may be operable to command application of brake torque to oppose at least in part the drive torque by commanding a vehicle system such as a brake controller to apply brake torque. In addition or instead the control system may command a powertrain controller to apply brake torque by means of an electric machine, for example an electric machine operated as a generator.

In embodiments in which the user is commanded to apply drive torque, for example by depressing an accelerator pedal, the control system may be operable to command application of an amount of brake torque that is dependent on the amount of drive torque the user applies.

The control system may be operable to cancel motion control if the driver provides a brake control input, for example by applying pressure to a brake pedal. In embodiments in which the user is commanded to apply an accelerator control input, the system may be operable to cancel motion control if the users ceases application of the accelerator control input, for example if the user releases an accelerator pedal.

The system may be adapted automatically to maintain slip of one or more vehicle wheels in the range 5-20%.

It is to be understood that the system may be operable to set the vehicle in motion over the driving surface and/or maintain motion of the vehicle over the driving surface in a forward or reverse driving direction.

This aspect of the invention may be considered to be counter-intuitive since a detection of loss of traction would normally require a reduction of wheel slip so as to maintain control of the vehicle. In this aspect of the invention wheel slip is maintained in order to ensure effective travel of the vehicle over a low friction surface.

By 'low friction surface' is meant any surface other than dry asphalt or concrete on which significant loss of traction can be experienced, typically an off-road surface of for example snow, mud or sand. Loss of traction may be defined as greater than 2% slip at any tyre/ground interface. Loss of traction may be detected in any suitable manner, for example by comparison of wheel speeds, or by comparison of wheel speeds and vehicle speed with respect to a fixed reference. A dry asphalt surface may be considered to have a surface coefficient of friction of 1. A relatively low surface coefficient of friction may be considered to be a value less than or equal to 0.5. However embodiments of the present invention are useful for assisting motion of a vehicle over surfaces having a surface coefficient of friction greater than 0.5.

Vehicle launch assist or traction aid according to an embodiment of the present invention may be implemented manually upon the vehicle driver being given an appropriate indication, or may be implemented automatically by a system of the vehicle. If implemented automatically, a suitable indicator may alert the driver that implementation is taking place, for example by a dashboard message, warning tone or haptic indication.

One of the required control inputs to the vehicle may comprise accelerator pedal position. Thus the vehicle driver may be commanded to depress the accelerator pedal in order to increase engine torque to maintain slip in the range 5-20%. If excess torque is present, the driver may be commanded to reduce the amount by which the accelerator pedal is depressed, in other words reduce the accelerator pedal 'opening'. The system may be operable to provide prompts to guide a user to increase or decrease the amount of accelerator pedal depression. The driver may initiate motion control by lightly pressing on the accelerator pedal and following the prompts that are subsequently provided by the system. In some embodiments the system may be operable to perform automatic torque capping in which the powertrain is operable under the control of the control system to develop drive torque up to a maximum value corresponding to the amount by which the driver has depressed the accelerator pedal. The system is configured to determine the amount of required drive torque and command the powertrain to develop a corresponding amount of drive torque up to the maximum value indicated by the instant accelerator pedal position. Any suitable means of indicating a required control input may be used, including voice commands, haptic feedback, display messages, charts, graphs and the like.

The method may comprise compensating for an excess of drive torque by means of a braking system and/or powertrain torque reduction system. Thus in embodiments in which an actuator such as an engine and/or electric motor is commanded to develop an amount of drive torque corresponding to actual instant accelerator control position, compensation for excess torque being made by application of brake torque and/or by means of a powertrain torque reduction system.

The powertrain torque reduction system may comprise one or more clutch devices operable to allow driveline slip at one or more locations of a powertrain thereby to reduce the amount of powertrain torque applied to one or more wheels. The amount of driveline slip is managed by the system, for example by varying an amount of clamping pressure between plates of a clutch devices such as a multi-plate wet clutch device or any other suitable device. Other arrangements are also useful.

The strategy of this aspect of the invention may be ceased automatically if wheel slip falls below a predetermined minimum, of for example 2%, or may be overridden or disabled manually by the vehicle driver. The strategy may be automatically enabled upon selection or detection of an off-road condition, or any other condition where loss of traction may be encountered—for example whilst driving in snow or where map data associated with a vehicle navigation system suggests the vehicle is driving on ground that does not correspond to a highway or road surface such as an asphalt or concrete road surface. The navigation system may be a satellite navigation system or any other suitable navigation system.

In some embodiments the strategy may be enabled automatically if a prescribed one or more vehicle operating modes are selected, either by a driver or automatically by the vehicle control system. For example the strategy may be enabled if a winter mode or the like is selected, or a 'launch assist' mode. The vehicle may be operable in one or more other modes in response to prevailing driving conditions, such as one or more terrain response (TR) modes. The TR modes may include one or more modes optimised for travel on slippery surfaces such as grass, gravel, snow or ice.

U.S. Pat. No. 7,349,776, the content of which is hereby incorporated by reference, describes a vehicle control system in which the driver can implement improved control over a broad range of driving conditions, and in particular over a number of different terrains which may be encountered when driving off-road. In response to a driver input command relating to the terrain, the vehicle control system is selected to operate in one of a number of different driving modes or TR modes. For each mode, the various vehicle subsystems are operated in a manner appropriate to the corresponding terrain. As described above, the vehicle may be operable automatically to implement launch assist according to an embodiment of the present in invention when motion of the vehicle is initiated from rest and one of a prescribed set of one or more TR modes has been selected. In some embodiments the vehicle may be operable automatically to select an appropriate TR mode for the prevailing driving conditions, and to implement motion control according to the present invention when motion of the vehicle is initiated from rest.

In an embodiment, a mode (for example a winter mode) is available in which the vehicle is configured to launch from standstill in a forward gear other than first gear such as a second or third gear to reduce risk of excessive wheel slip. Different modes may have different throttle maps (amount of engine torque developed for a given throttle pedal position), torque delivery (throttle maps in combination with a rate at which engagement of transmission clutches is controlled to take place thereby determining how aggressively gear shifts take place), and transmission shift points as a function of coefficient of surface friction. For example, transmission shift points may be arranged wherein gear shifts take place at lower speeds than they might otherwise take place at, and in a more gentle manner (e.g. at a slower rate).

Other arrangements are also useful.

The strategy of this aspect may be disabled above a predetermined vehicle speed, which speed may be set by the vehicle driver, or may be set automatically by a vehicle system.

Methods according to embodiments of the present invention are typically embodied in a vehicle control system, for example a clutch control system, adapted to automatically vary the coupling between motor and transmission and/or a torque vectoring system, to achieve the intended result. The clutch may be a lock-up clutch of a torque converter. The control system may further control motor torque by alteration of the engine torque/speed map, and be fully automatic upon selection of a suitable control by the vehicle driver.

In one embodiment, the control system is part of a clutch control ECU having input signals from a network bus or the like, giving the required information about motor speed (e.g. engine speed or electric propulsion motor speed), transmission speed, transmission ratio, wheel speed, ground speed and the like. Other information, such as motor torque may be derived from a look-up table of an ECU memory by reference to motor speed, optionally in combination with one or more other parameters such as driver demanded torque, fuel flow rate, induction air flow rate and/or one or more other parameters.

Once initiated by the vehicle driver, movement of the vehicle may be fully automatic until the desired coupling between motor and transmission is achieved, the vehicle has the desired speed or wheel slip has fallen below a prescribed threshold. The threshold may be dependent on speed and/or one or more other parameters such as coefficient of friction. The vehicle speed may be maintained until or unless the vehicle driver takes manual control, for example by advancing (depressing) an accelerator pedal, depressing a brake pedal or another system takes over; the latter may be for example a cruise control module whereby the vehicle driver may speed up or slow down by the use of the usual + and − buttons.

The system may include a torque controller for selectively distributing engine output between driven wheels of the vehicle.

The controller may be adapted to control the rotational speed of the driven wheels by application of respective wheel brakes.

The system may be operable to perform torque vectoring in respect of a plurality of vehicle wheels.

The system may further include means for sensing ground speed relative to vehicle speed.

For example, the vehicle may be provided with means for measuring actual speed of travel over ground such as a radar based technique, a camera based technique, a global satellite positioning system (GPS) based technique or any other suitable technique. By vehicle speed is meant a reference vehicle speed employed by one or more vehicle systems requiring knowledge of vehicle speed. The reference vehicle speed may be determined by measurements of wheel speed, and may be vulnerable to erroneous values in the event of slip of one or more wheels. Reference speed may be particularly vulnerable to erroneous values in the event that all wheels of the vehicle are driven and slip of all the driven wheels takes place.

The system may be adapted to determine the maximum permitted slip according to an operating condition of the vehicle.

Optionally the system includes a command device for instructing a vehicle driver to vary a driver-controlled input, such as a brake and/or accelerator pedal.

The system may be operable to command application of drive torque by commanding a vehicle driver to vary a control input such as an accelerator pedal thereby to allow sufficient drive torque to be developed to initiate motion from rest.

The system may be operable to instruct the vehicle driver to vary the control input via a vehicle HMI.

Advantageously the system may be operable to command application of drive torque directly.

Thus the system may be operable to communicate directly with a vehicle system for applying drive torque such as a powertrain controller or an engine controller.

Embodiments of the present invention may be used in vehicles with automatic transmissions and may be adapted for use with vehicles having manual transmissions. In an embodiment for use with a vehicle having a manual transmission the system may be operable to guide a driver to select an appropriate gear or gear configuration in the event the vehicle has a high/low ratio selector in addition to a transmission gear selector. By gear configuration is meant a particular combination of high or low ratio and transmission gear, optionally a choice of two or more combinations. The control system may then provide the driver with an indication of the amount by which the accelerator pedal should be depressed and optionally in addition guide a driver to release a clutch of the vehicle to engage the transmission. The control system may guide the driver to release the clutch by a suitable amount and optionally at a suitable rate to prevent stalling of the vehicle. The control system may in turn command directly a brake controller to apply a brake to a wheel whereby brake torque is developed to prevent flare of one or more driven wheels as the wheels begin to rotate. In the event brake torque is applied by means of an electric machine the control system may command application of the brake torque by the electric machine. In an embodiment of the invention a green indicator lamp may illuminate when the accelerator pedal is sufficiently depressed by the driver. A red lamp may illuminate if the clutch is released at too high a rate. Other arrangements are also useful.

In one aspect of the invention for which protection is sought there is provided a control system for setting a vehicle in motion over a driving surface and/or maintaining motion of said vehicle over the driving surface, the system being operable to initiate motion control by commanding application of a brake to one or more driven wheels, the system being further operable to command application of drive torque to the one or more driven wheels such that the vehicle is held stationary by the brake applied to the one or more wheels, the system being operable subsequently to initiate motion from rest whilst the brake continues to be applied to the one or more driven wheels to oppose the drive torque applied.

Motion may be initiated from rest by reducing the amount of brake torque developed by the brake applied to the one or more wheels, and/or by increasing the amount of drive torque applied to the one or more wheels.

It is to be understood that each wheel may be provided with a respective one or more brakes. Alternatively, a brake may be applied at a desired location of a driveline in order to oppose drive torque and prevent excessive wheel spin.

In a further aspect of the invention for which protection is sought there is provided a vehicle comprising a system according to a preceding aspect.

In one aspect of the invention there is provided a vehicle having a plurality of selectable operating conditions, and a system according to one of the preceding aspects.

In one aspect of the invention for which protection is sought there is provided a vehicle speed control system comprising brake control means such as a brake controller and powertrain control means such as a powertrain controller. The brake control means and powertrain control means are operable to control the net amount of torque applied to a driven axle. In operation, the control system enables the vehicle to accelerate from rest at a rate that is less than that achievable by the powertrain control means in the absence of application of the brake control means on a surface where the coefficient of friction between tyre and ground is substantially equal to 1, i.e. a surface offering relatively high grip. This is because the brake control means applies a retarding (brake) torque to the driven wheels as the vehicle is accelerated, acting against powertrain drive torque. This has the advantage that if the vehicle seeks to accelerate on a surface of relatively low surface coefficient of friction, a rate of acceleration may be greater than that which is in fact achievable by a driver, since application of the braking system prevents excessive wheel slip (flare) when positive powertrain drive torque is applied.

In one aspect of the invention for which protection is sought there is provided a method of setting a vehicle in motion over a driving surface and/or maintaining motion of said vehicle over the driving surface implemented by a control system. The method may comprise initiating motion control, initiating motion control comprising: commanding by the control system application of brake torque and drive torque to one or more wheels such that the vehicle is held stationary; subsequently initiating motion from rest whilst brake torque continues to be applied to the one or more wheels. The strategy may also be implemented to maintain vehicle progress on low friction surfaces. The vehicle driver may be commanded to vary a control input, such as accelerator pedal position, in order to facilitate the maintaining of progress.

In a further aspect of the invention for which protection is sought there is provided a non-transitory, computer-readable storage medium storing instructions thereon that when executed by one or more electronic processors causes the one or more processors to carry out a method as described above.

In an aspect of the invention for which protection is sought there is provided a control system for setting a vehicle in motion over a driving surface and maintaining motion of said vehicle over the driving surface, the system being operable to initiate motion control by application of brake torque and drive torque to one or more wheels such that the vehicle is held stationary and subsequently to initiate motion from rest whilst brake torque continues to be applied to the one or more wheels, the system being further configured to automatically determine required driver control inputs required to maintain a value of slip of one or more vehicle wheels over the driving surface within a predetermined range, and issue instructions to the vehicle driver of said required control inputs to the vehicle to maintain said slip.

In an embodiment the control system may comprise.

an electronic processor; and an electronic memory device electrically coupled to the electronic processor and having instructions stored therein, wherein the processor is configured to access the memory device and execute the instructions stored therein such that the system is operable to.

automatically determine said required driver control inputs and issue said instructions to the driver.

Within the scope of this application it is expressly intended that the various aspects, embodiments, examples and alternatives, and in particular the individual features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF DRAWINGS

An embodiment of the present invention will now be described, by way of example only with reference to the accompanying drawings in which.

DETAILED DESCRIPTION

Figure 1:
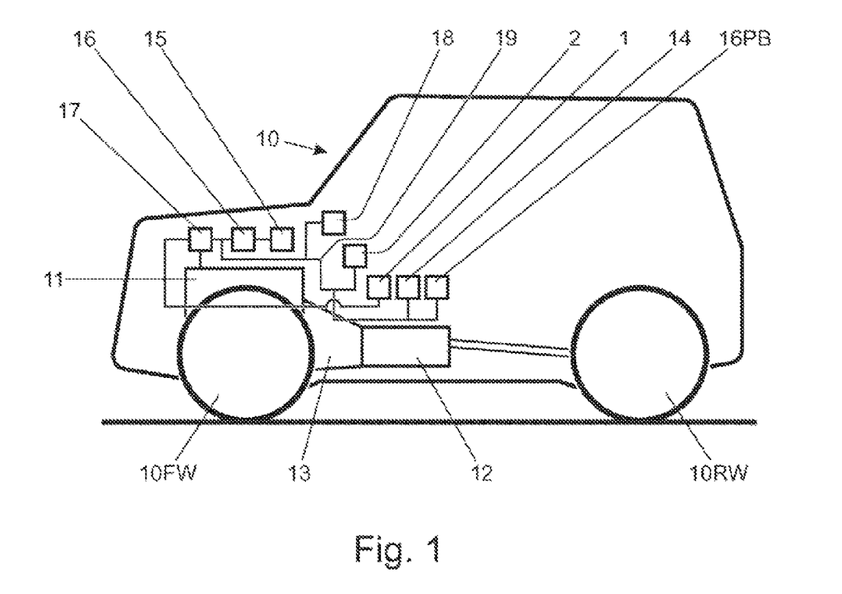
FIG. 1 illustrates a vehicle according to an embodiment of the present invention.

FIG. 1 is a schematic illustration of a vehicle 10 according to an embodiment of the present invention. The vehicle 10 has a prime mover or motor 11 in the form of an internal combustion engine. The engine 11 is coupled to a transmission 12 by means of a coupling 13. The coupling 13 is arranged to allow the transmission 12 progressively to reach a speed compatible with motor speed when the vehicle 10 is accelerated from rest. The coupling 13 is typically a friction clutch, torque converter or the like. An accelerator pedal 1 allows a driver to control an amount of torque developed by the motor 11 under the control of a powertrain controller 17 whilst a brake pedal 2 allows a driver to apply a braking system under the control of a brake controller 16.

The vehicle 10 includes a mode selector 14 operable by a driver to select a desired vehicle operating mode. These modes may comprise for example settings of suspension and drive train appropriate to different terrain conditions so as to best ensure effective vehicle performance and full utilization of the capabilities thereof. The modes may be referred to as 'terrain response' of TR modes as described above and in U.S. Pat. No. 7,349,776. The mode selector 14 may be operable by the vehicle driver to optimize the vehicle for travel over sand or gravel or rock. In some embodiments the vehicle 10 may be configured to allow automatic selection of operating mode by suitable vehicle mounted sensors arranged to sense one or more operating conditions.

Figure 2:
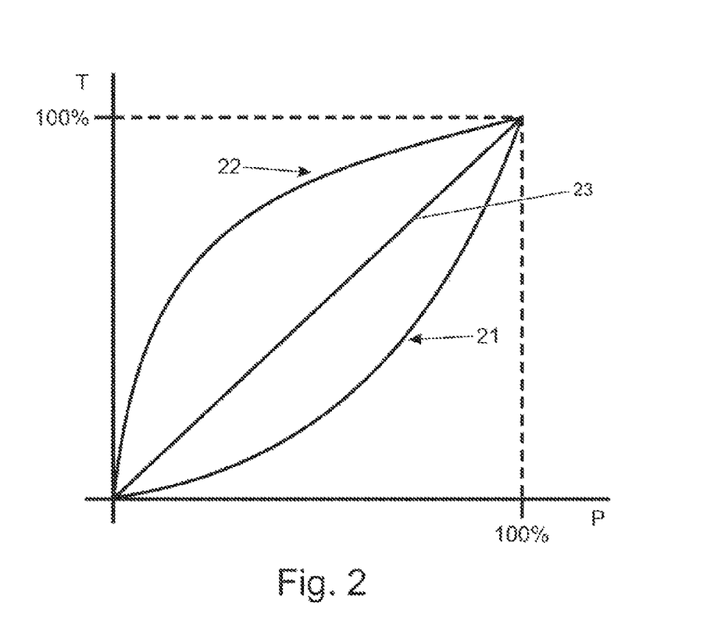
FIG. 2 illustrates pedal progression maps relating accelerator pedal position to engine torque output.

Movement of a vehicle from rest when off-highway requires care so as to avoid an inappropriate vehicle response. FIG. 2 illustrates typical pedal progression maps for travel over grass gravel or snow (GGS) 21, sand 22 and rock 23 whereby the torque output T of the vehicle motor is controlled by reference to accelerator pedal position P. Thus a high torque output is available for a small advance of accelerator pedal from a low % pedal position where sand mode is selected. In contrast, in GGS mode, torque output is less aggressive at low 5 pedal position, so as to avoid wheel spinning. Nevertheless, a control strategy for assisting a novice driver to move a vehicle from a rest condition is desirable, particularly where the terrain type is not correctly determined by the driver.

Embodiments of the present invention provide a launch assist functionality for assisting the driver to launch the vehicle from rest.

In the embodiment shown in FIG. 1, movement of the vehicle from rest is accomplished with deliberate wheel slip within a pre-determined range, so as to generate maximum traction at the tyre/terrain interface. Deliberate slip may be generated at driven wheels of at least one axle of the vehicle, and may be applied to all driven axles.

The amount of permitted slip is determined empirically according to vehicle type and terrain categorization, and may be as little as 5% for a hard surface such as rock, and as much as 20% for a soft granular surface such as sand. The amount of slip may be a function of vehicle speed also. In some embodiments the vehicle may be operable to permit slip of up to around 50%. Other values of wheel slip are also useful for various terrain conditions.

It is to be understood that by the term slip is meant an amount by which wheel speed exceeds vehicle speed.

A vehicle motor is generally able to generate sufficient torque to cause excessive rotation or flare of the driving wheels when the vehicle is at rest if so commanded. Conventional differential gears will generally allow uncontrolled spinning of one driven wheel, and accordingly some embodiments of the present invention are arranged to prevent excessive wheel spin.

The vehicle of the embodiment of FIG. 1 has a vehicle control unit (VCU) 15 operable to implement a launch assist function. When the launch assist function is active, the VCU 15 is operable to command the brake controller 16 to apply a brake to one or more driven wheels (such as brake pressure in the case of a pressure-actuated braking system) whilst the vehicle 10 is stationary in order to resist acceleration of the one or more wheels when engine drive torque is applied to the one or more driven wheels. This retarding torque reduces a risk of flare of the wheel when drive torque is applied, and manages the rate of rise of net torque at each wheel below a rate achievable via the powertrain controller 17 alone.

In some arrangements brake torque is applied to each wheel of a driven axle. In situations in which the values of surface coefficient of friction between the ground and opposite wheels of an axle are substantially different, this reduces a risk that vehicle progress is impeded substantially by slip of one wheel relative to the other. In some embodiments controllable limited slip differential gears may be employed to mitigate this problem, and/or a system of torque vectoring whereby the vehicle transmission 12 is adapted to direct torque to individual driven wheels according to demand.

In embodiments having a differential gearbox between driven wheels of one or more axles, the application of brake torque to the driven wheels may serve to distribute torque across the differential in a favourable manner in the event one of the wheels experiences a surface having a lower surface coefficient of friction than that experienced by the other wheel. That is, torque may be redistributed such that a larger amount of torque is applied to the wheel experiencing a surface of higher surface coefficient of friction.

It is to be understood that according to convention wisdom spinning of wheels above a relatively small amount is considered generally undesirable, and accordingly prior art systems aim to maintain wheel slip at as low a value as possible. However in some embodiments of the present invention an excess of torque is provided by the vehicle engine 11 in order to ensure deliberate controlled slip within a required range. Application of brake torque to one or more driven wheels assists in controlling slip, particularly as the vehicle 10 is launched from rest.

In order to maintain driven wheels in controlled slip, a means of determining slip is required. Suitable devices comprise individual wheel speed indicators, which may be derived from anti-lock braking sensors, in conjunction with an indicator of vehicle speed. The latter may be derived from non-driven wheels, from a GPS system, an inertial measurement unit (IMU) or in any other convenient manner. Camera systems may be provided to measure individual wheel rotation speed, or to detect relative movement of the terrain relative to the vehicle. Radar systems or the like whereby an electromagnetic beam is projected and received may also be used to give an indication of vehicle speed over the terrain.

Signals of wheel speed, vehicle speed, engine output torque and other parameters are available on a vehicle network bus, which in the present embodiment is a controller area network (CAN) bus 19. The signals are refreshed at a suitable refresh rate, for example exceeding 10 Hz.

Suitable algorithms, developed empirically, or look-up tables assign a range of appropriate slip according to the selected terrain condition. The selected terrain condition may be set by the driver by means of selector 14 as described above, or recognised automatically by the VCU 15. The degree of slip assigned may also take into account other factors, such as the transmission ratio selected, and the pitch angle or roll angle of the vehicle at rest. Environmental factors, such as whether it is raining (by reference to a rain sensor or whether windscreen wipers are set to 'on'), may also be taken into account, and/or other factors such as whether the vehicle is towing, a suspension loading, ambient temperature (such as whether the ambient temperature is below substantially zero Celsius) and any other suitable factor. Suitable signals of these factors are generally available on the CAN bus 19.

Figure 3:
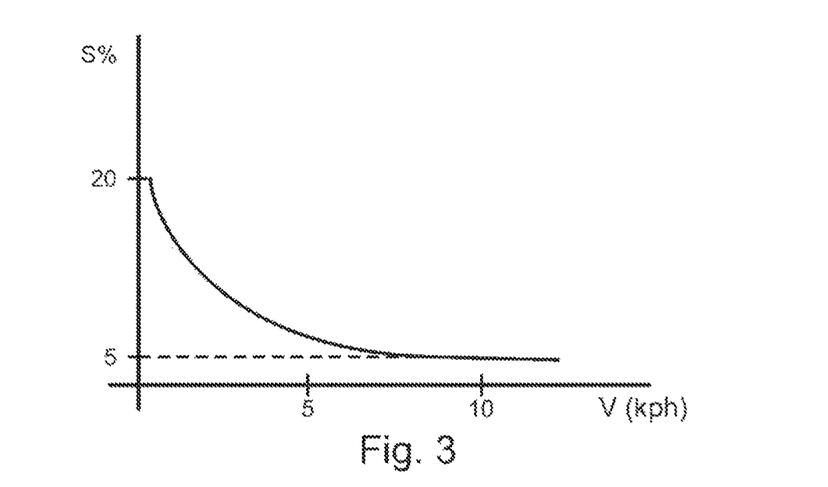
FIG. 3 illustrates the effect of the embodiment of the invention in graphical form.

FIG. 3 illustrates a typical characteristic for moving from rest over sand. The vehicle driver may initialise vehicle launch assist (VLA) functionality by selecting VLA from a menu displayed on an HMI display 18. In the present embodiment the function is operable to provide a fully automatic launch. For example, if a driver is struggling to ascend a hill without assistance, the driver may stop the vehicle and select VLA from the menu.

Once the VLA function is selected, the VCU 15 commands the brake controller 16 to apply (or maintain) braking torque to each wheel that is to be driven, the amount of braking torque depending on an estimated value of surface coefficient of friction between the driven wheels and the driving surface. In some embodiments, the amount of braking torque applied or maintained initially when the vehicle is at rest is a fixed value that is independent of surface coefficient of friction. The amount of brake torque may in some embodiments be determined in dependence at least in part on vehicle attitude and selected gear ratio in order to avoid unwanted movement such as roll-back of the vehicle.

The VCU 15 then commands powertrain controller 17 to generate sufficient engine torque to ensure initial wheel slip S % will be around 20%. The powertrain develops this power without a requirement for the driver to apply the accelerator pedal 1. It is to be understood that in some embodiments, positive powertrain torque may be commanded to exceed a substantially fixed braking torque, and/or braking torque may be gradually reduced in order to manage net wheel torque. As the vehicle gains traction and speed V (FIG. 4), the permitted degree of slip is progressively reduced to 5%, which may be desirable in certain sand conditions. At higher speeds or on different terrain relative slip may be reduced further. The time to achieve a steady state speed of around 10 kph may be in the range 1-3 seconds, at which point the vehicle driver may take over by advancing the accelerator pedal 1 or by engaging some other vehicle system such as cruise control. The steady state speed may be varied or selected according to conditions of use whilst launch assist is active.

In one embodiment of the present invention, once the launch assist function is enabled the VCU 15 immediately disables the launch assist function if any control input from the vehicle driver is detected via the accelerator pedal 1, brake pedal 2, parking brake switch 16PB, transmission control input or actuation of a manual gearbox clutch (where provided).

Figure 4:
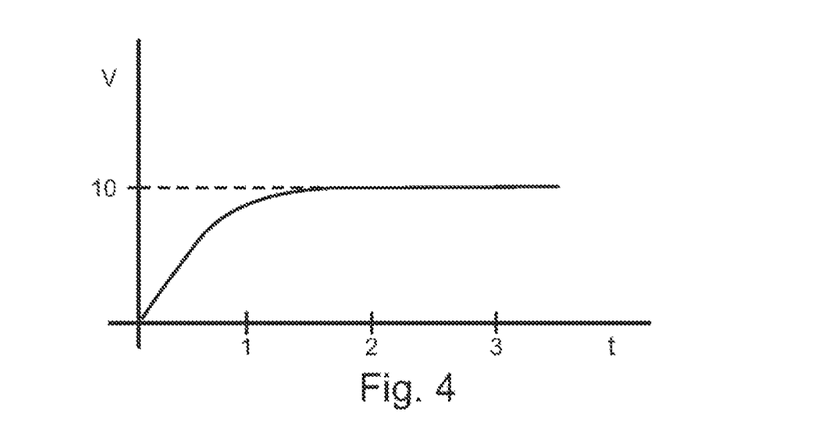
FIG. 4 corresponds to FIG. 3 and shows rising vehicle speed.

FIG. 4 illustrates a typical increase in vehicle speed V over time t as traction is gained, and speed rises to the steady state. This steady state speed may of course vary according to terrain and other conditions, according to pre-set values retained in a look-up table, or according to an algorithm.

Figure 5:
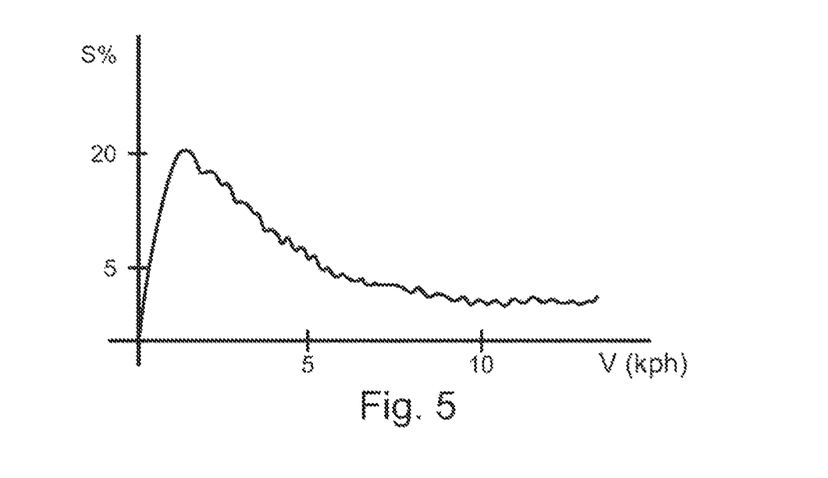
FIG. 5 corresponds to FIG. 3 and shows relative wheel slip.

FIG. 5 illustrates typical wheel slip S as vehicle speed V increases. Initially slip is substantially zero (wheel stationary) but rapidly increases to 20% before dropping to a steady state value of 5%. Minor variations of wheel speed are corrected at the refresh rate of the control system, which may be 10 Hz or greater.

Figure 6:
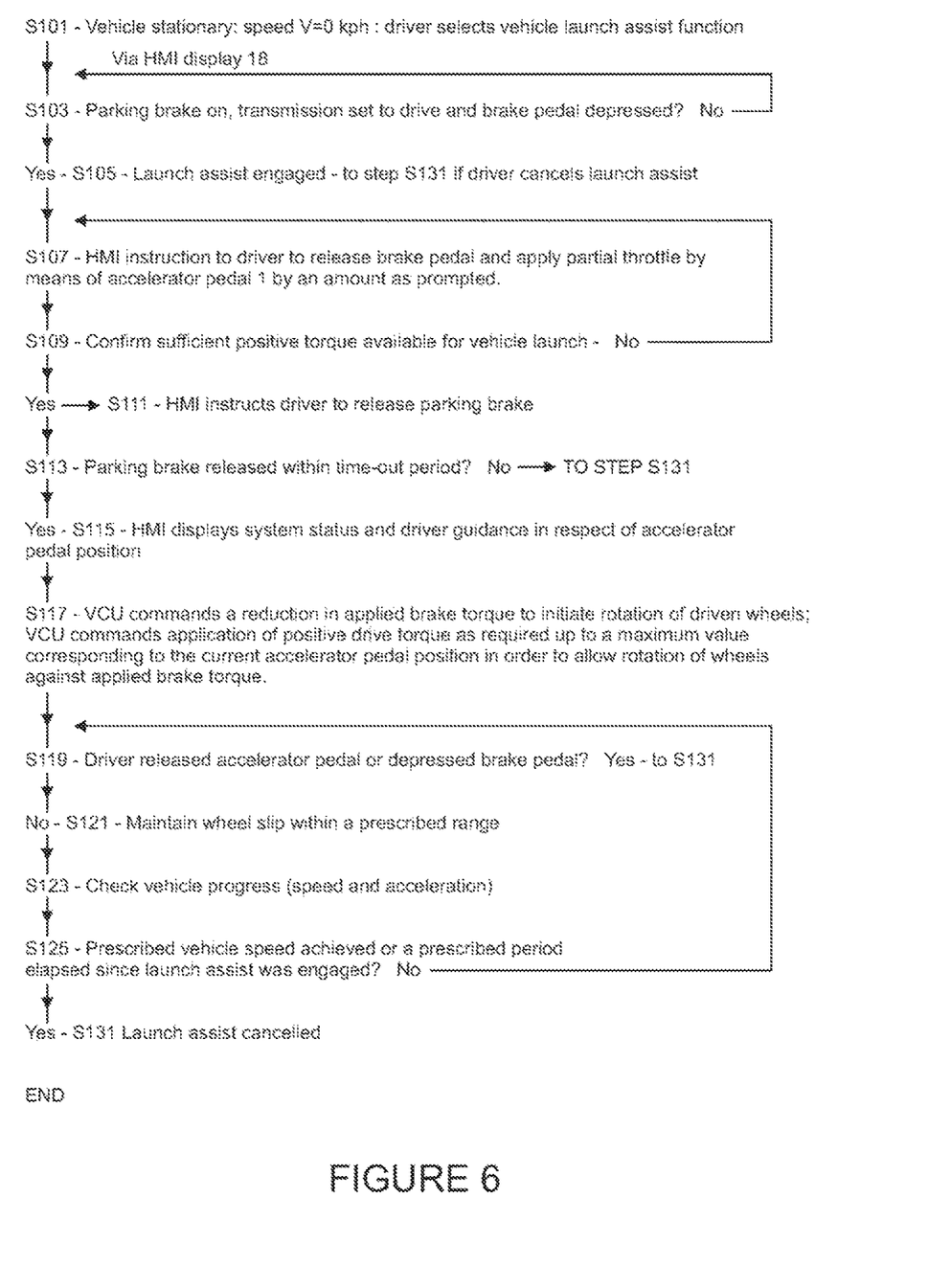
FIG. 6 is a flow chart describing operation of a vehicle control unit according to an embodiment of the present invention.

One embodiment of the present invention will now be described with reference to the flow diagram of FIG. 6.

At step S101 the vehicle 10 is stationary with a speed V=0 kph and engine 11 running. The driver of the vehicle selects the vehicle launch assist function via HMI display 18.

At step S103 the VCU 15 checks whether the parking brake has been applied (set to on) via parking brake switch 16PB, whether the transmission 12 is set to drive mode and whether the driver is currently depressing the brake pedal 2. In some embodiments the VCU 15 does not require the brake pedal 2 to be depressed. Other arrangements are also useful.

If these conditions are met, then at step S105 launch assist is 'engaged', i.e. the VCU 15 begins executing computer program code implementing launch assist functionality.

If the driver subsequently cancels launch assist functionality—by pressing a 'cancel' button displayed on the HMI display 18, releasing the accelerator pedal 1 once the pedal 1 has been depressed following instruction by the vehicle HMI display 18, or if the driver depresses the brake pedal 2 after being instructed to release it by the vehicle HMI display 18), then the VCU 15 proceeds directly to step 3131 where launch assist is cancelled and the VCU 15 terminates execution of code implementing launch assist functionality.

At step S107 the VCU 15 instructs the driver (via the HMI display 18) to release the brake pedal 2 and apply partial throttle by means of the accelerator pedal 1 by an amount as prompted.

At step S109 the VCU 15 continues to command application of brake torque to hold the vehicle 10 stationary, and makes a determination as to whether or not sufficient positive torque is available for vehicle launch against a prescribed amount of brake torque. This determination may be made by reference to a powertrain torque demand signal, a signal indicative of actual powertrain torque delivered or by any other suitable means. If the VCU 15 determines that sufficient torque is not available the VCU 15 returns to step S107.

If sufficient torque is available, then at step S111 the VCU 15 provides an instruction to the driver via the HMI display 18 to release the parking brake via parking brake switch 16PB.

At step S113 the VCU 15 determines whether the parking brake switch 16PB has been actuated to release the parking brake within a prescribed period of time. In the present embodiment the prescribed period is 10 s, although other values are also useful. If the driver does not signal release of the parking brake via switch 16PB within the prescribed period then the VCU 15 continues at step S131.

If the driver does signal release of the parking brake within the prescribed period the VCU 15 continues at step S115. At step S115 the VCU 15 displays, via HMI 18, an indication that launch assist functionality is active and provides driver guidance in respect of accelerator pedal position. Specifically, the VCU 15 instructs the driver via HMI 18 as to by how much the accelerator pedal 1 must be depressed in order to enable the engine 11 to develop sufficient torque for vehicle launch.

Once the VCU 15 determines that sufficient torque is being developed, at step S117 the VCU 15 commands the brake controller 16 to command a reduction in brake torque applied to driven wheels of the vehicle 10. A prescribed amount of brake torque, determined by the VCU 15, continues to be applied to the driven wheels. In a situation where not all wheels of the vehicle 10 are driven (such as in a two wheel drive vehicle or a four wheel drive vehicle operated in a two wheel drive configuration), the VCU 15 may command substantially full release of brake torque to the non-driven wheels such that they are free to rotate with substantially no brake torque applied thereto. The non-driven wheels may subsequently provide a useful vehicle reference speed.

It is to be understood that the VCU 15 may then command an increase or decrease in torque developed by the engine 11 and applied to the driven wheels as required. In some embodiments, instead of modulating engine torque in order to deliver an amount of drive torque demanded by the VCU 15, the powertrain controller 17 may be operable to modulate an amount of drive torque delivered to a driven wheel by means of a clutch, a torque converter or by any other suitable means.

At step S119 the VCU 15 determines whether the driver has released the accelerator pedal 1 or depressed the brake pedal 2. If such an event has occurred, the VCU 15 continues at step S131 and vehicle launch assist functionality is deactivated.

If such an event has not occurred, then at step S121 the VCU 15 continues to maintain wheel slip within a prescribed range by simultaneous/synchronised control of powertrain drive torque and brake torque.

At step S123 the VCU 15 checks vehicle progress by reference to vehicle speed V and vehicle acceleration. The VCU 15 continues to maintain wheel slip within the prescribed range as at step S121.

At step S125 the VCU 15 determines whether a prescribed vehicle speed (such as 10 kph or any other suitable value) has been achieved or a prescribed time period has elapsed since launch assist was engaged. If either of these conditions are met the VCU 15 continues at step S131 and launch assist is disengaged (cancelled). If neither condition is met the VCU 15 continues at step S119.

Figure 7:
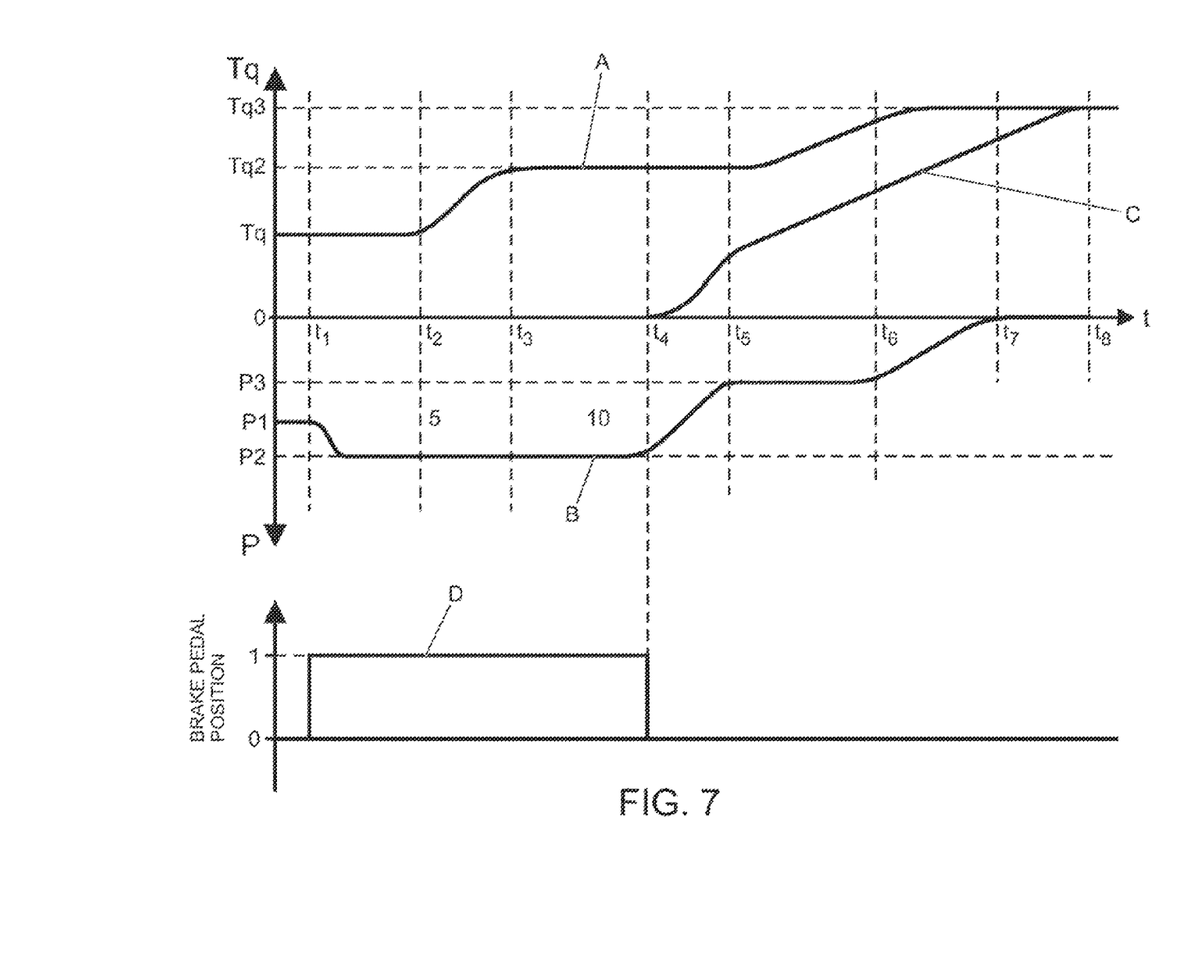
FIG. 7 is a plot of powertrain torque and brake torque as a function of time during a vehicle launch under the control of a control system according to an embodiment of the present invention.

Operation of a control system having a VCU 15 according to an embodiment of the present invention will now be described with reference to FIG. 7. FIG. 7 is a plot of powertrain torque Tq (trace A) and brake pressure P (trace 8) as a function of time as a vehicle 10 is launched from rest under the control of VCU 15. A net amount of torque TqNET applied to driven wheels of the vehicle 10 is shown by trace C. The value of a brake pedal position signal as a function of time is shown by trace D, where a value of zero corresponds to a released brake pedal 2 and a value of 1 corresponds to a substantially fully depressed brake pedal 2.

For the purposes of the plot of FIG. 7 the vehicle 10 is considered to operate in a front wheel drive mode in which drive torque is applied to a pair of front wheels 10FW of the vehicle and not a pair of rear wheels 10RW. Measurements of speed of rotation of the rear wheels 10RW is employed to determine vehicle speed. The vehicle 10 is also operable in a four wheel drive mode in which the front and rear wheels 10FW, 10RW are driven.

At time t=0 the vehicle 10 is held stationary by the parking brake selected by parking brake selector 16PB. Brake pressure of value P1 is applied to the braking system under the control of brake controller 16 when the parking brake is applied. Engine 11 is controlled to run at idle speed developing drive torque Tq1.

The driver then selects the vehicle launch assist function via HMI display 18. The VCU 15, determining that the parking brake is on and the vehicle is stationary, commands the driver via HMI display 18 to depress the brake pedal 2 and to set the transmission 12 to drive mode 'D'. As the driver does so, at time t1, the amount of brake pressure increases to P2.

At time t2, a prescribed period after the driver has depressed the brake pedal 2 and set the transmission 12 to drive mode the VCU 15 instructs the driver to release the brake pedal 2 and to apply partial throttle by depressing the accelerator pedal 1 by an amount as prompted.

At time t2 the driver depresses the accelerator pedal 1 and at time t3 the amount of torque developed by the engine 11 reaches an amount Tq2. The VCU 15 determines that this amount of torque is sufficient for vehicle launch and instructs the driver to release the parking brake by means of selector 16PB.

At time t4 the driver chooses to release the parking brake by means of selector 16PB, if the driver does not release the parking brake within a 10 s time-out period from the moment the driver is instructed to do so, launch assist functionality is cancelled. If the driver does release the parking brake within this period, the VCU 15 commands the brake controller 16 to reduce gradually the brake pressure applied to the front wheels 10FW from a value P2 to a value P3. Brake pressure applied to the non-driven rear wheels 10RW is reduced substantially to zero at this time.

As the brake pressure to the front wheels 10FW is reduced, the net amount of positive drive torque applied to the front wheels 10FW increases as shown by trace C. The vehicle 10 therefore begins to accelerate from rest.

The VCU 15 monitors slip of the driven wheels 10FW by comparing their speed of rotation with that of the non-driven rear wheels 10RW. The VCU 15 modulates the brake pressure P as required in order to maintain a prescribed value of wheel slip. The prescribed value of wheel slip is a function of coefficient of friction between the wheels and the ground, and speed V of the vehicle 10. The prescribed wheel slip is also a function of the selected vehicle mode as indicated by mode selector 14.

At time t5 the VCU 15 determines that the vehicle 10 is accelerating and that the rate of acceleration has an expected correlation with wheel slip indicating satisfactory progress is being made. It is to be understood that if the rate of acceleration is lower than expected for a given amount of wheel slip, the vehicle 10 may increase brake pressure P in order to seek to reduce wheel slip and increase the rate of acceleration. The VCU 15 may also adjust the amount of torque powertrain developed by the engine 11 in order to prevent stalling thereof.

Alternatively the VCU 15 may reduce brake pressure P in order to increase wheel speed and therefore wheel slip in order to increase rate of acceleration depending on the nature of the surface over which the vehicle 10 is driving. The course of action taken by the VCU 15 may depend on one or more factors such as surface coefficient of friction between wheel and ground, type of terrain (determined for example by reference to selected TR mode), driving surface roughness, wheel articulation, vehicle attitude, ambient temperature and/or a determination whether precipitation is present.

As a consequence of determining that satisfactory progress is being made, at time t5 the VCU 15 commands an increase in engine torque to a value Tq3 greater than Tq2 in order to maintain progress. Subsequently, at time t6, the VCU 15 determines that the speed of the vehicle 10 is approaching a prescribed value, in the present embodiment a value V=10 kph. The VCU 15 therefore reduces brake pressure P applied to the front wheel brakes substantially to zero between time t6 and t7. The amount of torque developed by the engine 11 may be adjusted as the brakes are released in order to compensate for the corresponding reduction in brake torque. At time t7 the vehicle is controlled to maintain a speed of 10 kph for a prescribed period of time (in the present embodiment a period of 5 s) and the VCU 15 informs the driver that vehicle launch assist functionality is complete. It is to be understood that the VCU 15 is operable to terminate launch assist before the prescribed period expires it the driver depresses the accelerator pedal 1 or brake pedal 2.

The present description of embodiments of the present invention concerns movement of a vehicle from rest. A system and method according to some embodiments of the present invention may in addition or instead be used to maintain progress of a vehicle across a low friction surface, of across a surface with varying values of coefficient of friction. Thus upon detection of a failure to make progress, as indicated for example by a falling vehicle speed for a steady accelerator pedal position, the VCU 15 may be operable automatically to implement traction aid functionality according to the present invention in which a braking force is applied to one or more driven wheels to oppose drive torque. Vehicle wheel slip is then controlled to maintain slip within a range that will allow the vehicle 10 to increase or at least maintain speed of travel over terrain in a suitable manner. It is to be understood that the presence of brake torque acting against powertrain drive torque reduces excessive wheel slip and may enable more precise control of wheel slip.

Such an arrangement may involve automatic engagement and disengagement of braking force to one or more wheels as circumstances dictate, and without action by the vehicle driver. A suitable indication on the HMI display 18 or a haptic indicator may alert the driver to activation of traction aid functionality. Means may be provided for a vehicle driver to inhibit the traction aid functionality if desired.

In an alternative or additional method, the occurrence of wheel slip above a prescribed value when a driver seeks to initiate motion over a surface from rest independently of the launch assist function is detected as an indication of loss of traction. The VCU 15 responds to this situation by implementing launch assist functionality automatically. Thus the VCU 15 implements a strategy of maintaining controlled slip to ensure effective motion of the vehicle 10 over ground. Braking torque is applied automatically to reduce a risk of flare of the driven wheels. In order to maintain adequate drive train torque sufficient to execute a vehicle launch, the driver is instructed automatically by a vehicle system to make control inputs, principally to vary the accelerator pedal position. By this means an adequate excess as well as a suitable maximum of torque can be assured. Excessive torque applied at any given moment in time may be countered by increasing an amount of brake torque or by any other suitable means. Instruction of the vehicle driver may be by any suitable method, including voice command, haptic feedback, a message via HMI display 18 or display of a chart or graph showing actual and required powertrain torque to guide a driver to apply the required amount of accelerator pedal depression. A suitable electronic control unit may issue instructions to the driver in response to measurement, estimation or detection of wheel slip to enable the vehicle automatically to maintain the desired degree of slip.

In some embodiments, modulation of the amount of positive drive torque developed by a powertrain may be performed by regulation of an engine idle speed. Idle speed may be regulated so as to resist engine stall induced by automatic application of brake torque.

It is to be understood that embodiments of the present invention are also useful in vehicles that are not optimised for off-road driving. Embodiments of the invention are suitable for use with vehicles having driven wheels only at the front or rear thereof. Such vehicles may have occasion to drive on surfaces of relatively low surface coefficient of friction, for example wet grass, snow or ice. The vehicles may encounter situations in which progress over the surface becomes difficult due to limited traction and excessive wheel slip. Embodiments of the present invention have the advantage that such vehicles may be provided with substantially improved traction capabilities when operating on such surfaces. They may be enabled to make progress over the surface when such progress might otherwise not be possible, particularly for drivers not having off-road driving experience. Embodiments of the present invention may be usefully applied in vehicles whose driving characteristics vary considerably between fully laden and unladen states such as trucks, buses and the like.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment of example of the invention are to be understood to be applicable to any other aspect, embodiment or example described herein unless incompatible therewith.

The invention claimed is:

1. A control system for setting a vehicle in motion over a driving surface and maintaining motion of said vehicle over the driving surface, the system being operable to initiate motion control by commanding application of brake torque and drive torque to one or more wheels such that the vehicle is held stationary and subsequently to initiate motion from rest while brake torque continues to be applied to the one or more wheels, the system being further configured to automatically maintain a value of slip of one or more vehicle wheels over the driving surface, wherein the value of slip maintained is within a predetermined range.

2. A control system according to claim 1 comprising:
an electronic processor; and
an electronic memory device electrically coupled to the electronic processor and having instructions stored therein, wherein the processor is configured to access the memory device and execute the instructions stored therein such that the system is operable to:

initiate said motion control and automatically maintain said value of slip within said predetermined range.

3. A control system according to claim 2 wherein said processor comprises an input for receiving an electrical signal indicative of one or more characteristics of the driving surface over which the vehicle is travelling, and wherein said processor is configured to determine said value of slip in dependence on said signal indicative of said one or more characteristics of the driving surface.

4. A control system according to claim 2 wherein said processor further comprises an input for receiving an electrical signal indicative of the speed of the vehicle, and wherein said processor is configured to determine said value of slip to be maintained in dependence upon said value of slip in dependence on said signal indicative of the speed of the vehicle.

5. A control system according to claim 4 wherein said value of slip maintained decreases with increasing vehicle speed.

6. A control system according to claim 5 wherein said processor further comprises an input for receiving an electrical signal indicative of the engine speed of the vehicle, and wherein said processor is configured to compare automatically said signal indicative of the engine speed of the vehicle and said signal indicative of the speed of the vehicle and reduce said maintained value of slip as said vehicle speed approaches a speed that corresponds to the engine speed.

7. A system according to claim 1, operable to command application of drive torque by commanding a vehicle driver to vary a control input thereby to allow sufficient drive torque to be developed to initiate motion from rest.

8. A system according to claim 7, operable to instruct the vehicle driver to vary the control input via a vehicle HMI.

9. A system according to claim 1, operable to command application of drive torque directly.

10. A vehicle comprising a system according to claim 1.

11. A control system for setting a vehicle in motion over a driving surface and maintaining motion of said vehicle over the driving surface, the system being operable to initiate motion control by application of brake torque and drive torque to one or more wheels such that the vehicle is held stationary and subsequently to initiate motion from rest while brake torque continues to be applied to the one or more wheels, the system being further configured to:

automatically determine required driver control inputs required to maintain a value of slip of one or more vehicle wheels over the driving surface within a predetermined range, and issue instructions to the vehicle driver of said required control inputs to the vehicle to maintain said slip.

12. A control system according to claim 11 comprising:

an electronic processor; and an electronic memory device electrically coupled to the electronic processor and having instructions stored therein, wherein the processor is configured to access the memory device and execute the instructions stored therein such that the system is operable to:

automatically determine said required driver control inputs and issue said instructions to the driver.

13. A vehicle comprising a control system according to claim 11.

14. A method of setting a vehicle in motion over a driving surface and maintaining motion of said vehicle over the driving surface, method comprising:

commanding application of brake torque and drive torque via a traction control system of the vehicle, comprising one or more electronic processors, to one or more wheels such that the vehicle is held stationary;

subsequently initiating motion from rest while brake torque continues to be applied to the one or more wheels, wherein the method further comprises automatically maintaining slip of one or more vehicle wheels over the driving surface via the one or more electronic processors, wherein the value of slip maintained is within a predetermined range.

15. A method according to claim 14, wherein the value of slip maintained is determined in dependence on one or more characteristics of the driving surface.

16. A method according to claim 14 wherein the value of slip maintained decreases with increasing vehicle speed.

17. A method according to claim 14, wherein the value of slip maintained is automatically reduced as the vehicle speed approaches a speed that corresponds to the motor speed.

18. A method according to claim 14, wherein the slip is maintained in the range of 5-20%.

19. A method according claim 14 comprising automatically terminating motion control once a speed of the vehicle over the driving surface exceeds a prescribed value.

20. A non-transitory, computer-readable storage medium storing instructions thereon that when executed by the one or more electronic processors causes the one or more processors to carry out the method of claim 14.

* * * * *